US012444098B2

(12) United States Patent
Hashimoto

(10) Patent No.: US 12,444,098 B2
(45) Date of Patent: Oct. 14, 2025

(54) IMAGE PROCESSING DEVICE AND IMAGE PROCESSING METHOD

(71) Applicant: HAMAMATSU PHOTONICS K.K., Hamamatsu (JP)

(72) Inventor: Fumio Hashimoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 340 days.

(21) Appl. No.: 17/795,566

(22) PCT Filed: Jan. 27, 2021

(86) PCT No.: PCT/JP2021/002809
§ 371 (c)(1),
(2) Date: Jul. 27, 2022

(87) PCT Pub. No.: WO2021/153604
PCT Pub. Date: Aug. 5, 2021

(65) Prior Publication Data
US 2023/0102661 A1 Mar. 30, 2023

(30) Foreign Application Priority Data
Jan. 29, 2020 (JP) ................ 2020-012243

(51) Int. Cl.
*G06T 11/00* (2006.01)
*A61B 6/00* (2024.01)
*G06T 5/70* (2024.01)

(52) U.S. Cl.
CPC .......... *G06T 11/005* (2013.01); *A61B 6/5258* (2013.01); *G06T 5/70* (2024.01);
(Continued)

(58) Field of Classification Search
None
See application file for complete search history.

(56) References Cited

U.S. PATENT DOCUMENTS

2019/0362522 A1* 11/2019 Han .................. A61B 5/055
2020/0005460 A1   1/2020 Dou et al.
(Continued)

FOREIGN PATENT DOCUMENTS

CN  103955899 A  7/2014
CN  107133549 A  9/2017
(Continued)

OTHER PUBLICATIONS

International Preliminary Report on Patentability mailed Aug. 11, 2022 for PCT/JP2021/002809.
(Continued)

*Primary Examiner* — Delomia L Gilliard
(74) *Attorney, Agent, or Firm* — Faegre Drinker Biddle & Reath LLP

(57) ABSTRACT

An image processing apparatus includes a feature extraction unit, a reconstruction unit, an evaluation unit, and a control unit. The feature extraction unit inputs an input image to a feature extraction NN, and outputs an intermediate image from the feature extraction NN. The reconstruction unit inputs the intermediate image to an m-th reconstruction NN, and outputs an m-th output image from the m-th reconstruction NN. The evaluation unit obtains an evaluation value based on a sum of differences between the m-th tomographic image and the m-th output image. The control unit repeatedly performs processes of the feature extraction unit and the reconstruction unit, calculation of the evaluation value by the evaluation unit, and training of the feature extraction NN and the m-th reconstruction NN based on the evaluation value.

15 Claims, 16 Drawing Sheets

(52) U.S. Cl.
CPC ............... *G06T 2207/10081* (2013.01); *G06T 2207/10088* (2013.01); *G06T 2207/10104* (2013.01); *G06T 2207/10108* (2013.01); *G06T 2207/20081* (2013.01); *G06T 2207/20084* (2013.01); *G06T 2207/30016* (2013.01); *G06T 2211/424* (2013.01)

(56) References Cited

U.S. PATENT DOCUMENTS

| | | | | |
|---|---|---|---|---|
| 2021/0027436 | A1* | 1/2021 | Banerjee | G06T 7/0012 |
| 2022/0121884 | A1* | 4/2022 | Zadeh | G06N 3/006 |
| 2023/0102661 | A1* | 3/2023 | Hashimoto | G06T 11/008 382/131 |

FOREIGN PATENT DOCUMENTS

| | | | |
|---|---|---|---|
| CN | 108710904 A | 10/2018 | |
| CN | 109598727 A | 4/2019 | |
| CN | 109805950 A | 5/2019 | |
| CN | 110197516 A | 9/2019 | |
| CN | 110461228 A | 11/2019 | |
| EP | 3576049 A2 | 12/2019 | |
| JP | H08-030728 A | 2/1996 | |
| JP | 2019-510969 A | 4/2019 | |
| JP | 2019-069145 A | 5/2019 | |
| JP | 2019-113474 A | 7/2019 | |
| JP | 2019-211475 A | 12/2019 | |
| JP | 2021-087629 A | 6/2021 | |
| WO | WO-2017/148094 A1 | 9/2017 | |
| WO | 2018/003212 A1 | 1/2018 | |
| WO | WO-2021/041125 A1 | 3/2021 | |

OTHER PUBLICATIONS

Gong, Kuang et al., "PET Image Reconstruction Using Deep Image Prior," IEEE Transactions on Medical Imaging, 2018, pp. 1-11.

Hashimoto, F. et al., "Denoising of Dynamic Sinogram by Image Guided Filtering for Positron Emission Tomography," IEEE Transactions on Radiation and Plasma Medical Sciences, vol. 2, No. 6, 2018, pp. 541-548.

Hashimoto, F. et al., "Dynamic PET Image Denoising Using Deep Convolutional Neural Networks Without Prior Training Datasets," IEEE Access, vol. 7, 2019, pp. 96594-96603.

Lu, Lijun et al., "Dynamic PET Denoising Incorporating a Composite Image Guided Filter," IEEE Nuclear Science Symposium and Medical Imaging Conference (NSS/MIC), 2014.

Ulyanov, Dmitry et al., "Deep Image Prior", arXiv preprint arXiv:1711.10925, 2017.

* cited by examiner

IMAGE PROCESSING DEVICE AND IMAGE PROCESSING METHOD

TECHNICAL FIELD

The present disclosure relates to an apparatus and a method for creating a tomographic image after noise removal processing based on list data collected by a radiation tomography apparatus.

BACKGROUND ART

Radiation tomography apparatuses capable of acquiring a tomographic image of a subject (living body) include a positron emission tomography (PET) apparatus and a single photon emission computed tomography (SPECT) apparatus.

The PET apparatus includes a detection unit having a large number of small radiation detectors arranged around a measurement space in which the subject is placed. The PET apparatus detects a photon pair of an energy of 511 keV generated by electron-positron annihilation in the subject into which a positron-emitting isotope (RI source) is introduced by a coincidence method using the detection unit, and collects coincidence information. Then, a tomographic image showing a spatial distribution of generation frequency of the photon pairs in the measurement space (that is, a spatial distribution of the RI sources) can be reconstructed based on the collected many pieces of coincidence information.

In this case, a dynamic PET image including tomographic images of a plurality of frames can be obtained by dividing list data in which coincidence information collected by the PET apparatus is arranged in time series into the plurality of frames in a collection order, and performing image reconstruction processing using data included in each frame in the list data. The PET apparatus plays an important role in a nuclear medicine field and the like, and can be used to study, for example, a biological function or a brain high-order function.

The reconstructed tomographic image contains a lot of noise, and therefore, noise removal processing by an image filter is necessary. Examples of the image filter used for the noise removal include a Gaussian filter and a guided filter. Conventionally, the Gaussian filter is used. On the other hand, the guided filter is developed in recent years, and has a feature of being able to preserve a boundary of shading in the image compared to the Gaussian filter.

Patent Document 1 and Non Patent Documents 1 and 2 describe techniques for removing noise in a dynamic PET image by the guided filter. The technique described in Patent Document 1 and Non Patent Document 1 uses, as a guidance image, an image obtained by integrating the dynamic PET image including tomographic images of a plurality of frames in the noise removal processing using the guided filter. Further, the technique described in Non Patent Document 2 enables more effective noise removal by using a more appropriate guidance image.

Non Patent Document 3 describes a technique for removing noise from a PET image by a deep image prior technique (Non Patent Document 4) using a convolutional neural network (CNN), which is a type of a deep neural network (DNN).

CITATION LIST

Patent Literature

Patent Document 1: Chinese Patent Application Laid-Open Publication No. 103955899

Non Patent Literature

Non Patent Document 1: Lijun Lu et al., "Dynamic PET Denoising Incorporating a Composite Image Guided Filter", IEEE Nuclear Science Symposium and Medical Imaging Conference (NSS/MIC), 2014
Non Patent Document 2: F. Hashimoto et al., "Denoising of Dynamic Sinogram by Image Guided Filtering for Positron Emission Tomography", IEEE Transactions on Radiation and Plasma Medical Sciences, Vol. 2 No. 6, pp. 541-548, 2018
Non Patent Document 3: Kuang Gong et al., "PET Image Reconstruction Using Deep Image Prior", IEEE Transactions on Medical Imaging, 2018
Non Patent Document 4: Dmitry Ulyanov et al., "Deep Image Prior", arXiv preprint arXiv:1711.10925, 2017
Non Patent Document 5: F. Hashimoto et al., "Dynamic PET Image Denoising Using Deep Convolutional Neural Networks Without Prior Training Datasets", IEEE Access, Vol. 7, pp. 96594-96603, 2019

SUMMARY OF INVENTION

Technical Problem

The noise removal processing for the PET image by the techniques described in Patent Document 1 and Non Patent Documents 1 to 3 is superior in noise removal performance compared to the case of using the Gaussian filter. However, further improvement in noise removal performance is desired for PET images and SPECT images.

Non Patent Document 5 describes a technique capable of meeting the requirement for improvement of the noise removal performance. However, the noise removal technique described in Non Patent Document 5 takes a long time to process.

An object of the present invention is to provide an apparatus and a method capable of creating a noise-removed tomographic image with high performance based on list data collected by a radiation tomography apparatus and reducing time required for noise removal processing.

Solution to Problem

An embodiment of the present invention is an image processing apparatus. The image processing apparatus is an apparatus for removing noise from an m-th tomographic image created by dividing list data collected by a radiation tomography apparatus into M frames in a collection order and performing reconstruction processing based on the list data included in an m-th frame for each in of 1 or more and M or less, and includes (1) a feature extraction unit for inputting an input image to a feature extraction neural network and outputting an intermediate image from the feature extraction neural network; (2) a reconstruction unit for inputting the intermediate image to an m-th reconstruction neural network for each in of 1 or more and M or less and outputting an m-th output image from the m-th reconstruction neural network; (3) an evaluation unit for obtaining an evaluation value based on a sum of differences between the m-th tomographic image and the m-th output image of each in of 1 or more and M or less; and (4) a control unit for repeatedly performing respective processes of the feature extraction unit, the reconstruction unit, and the evaluation unit and training of the feature extraction neural network and the m-th reconstruction neural network of each in of 1 or more and M or less based on the evaluation value, and outputting a plurality of m-th output images from the m-th reconstruction neural network of each in of 1 or more and M or less.

An embodiment of the present invention is a radiation tomography system. The radiation tomography system includes a radiation tomography apparatus for collecting list data for reconstructing a tomographic image of a subject; and the image processing apparatus of the above configuration for creating the tomographic image after noise removal processing based on the list data collected by the radiation tomography apparatus.

An embodiment of the present invention is an image processing method. The image processing method is a method for removing noise from an m-th tomographic image created by dividing list data collected by a radiation tomography apparatus into M frames in a collection order and performing reconstruction processing based on the list data included in an m-th frame for each in of 1 or more and M or less, and includes (1) a feature extraction step of inputting an input image to a feature extraction neural network and outputting an intermediate image from the feature extraction neural network; (2) a reconstruction step of inputting the intermediate image to an m-th reconstruction neural network for each in of 1 or more and M or less and outputting an m-th output image from the m-th reconstruction neural network; (3) an evaluation step of obtaining an evaluation value based on a sum of differences between the m-th tomographic image and the m-th output image of each in of 1 or more and M or less; and (4) a training step of training the feature extraction neural network and the m-th reconstruction neural network of each in of 1 or more and M or less based on the evaluation value, and respective processes of the feature extraction step, the reconstruction step, the evaluation step, and the training step are repeatedly performed, and a plurality of m-th output images are output from the m-th reconstruction neural network of each in of 1 or more and M or less.

Advantageous Effects of Invention

According to the embodiments of the present invention, a noise-removed tomographic image can be created with high performance based on list data collected by a radiation tomography apparatus, and time required for noise removal processing can be reduced.

DESCRIPTION OF EMBODIMENTS

Hereinafter, embodiments of an image processing apparatus and an image processing method will be described in detail with reference to the accompanying drawings. In the description of the drawings, the same elements will be denoted by the same reference signs, and redundant description will be omitted. The present invention is not limited to these examples.

Figure 1:
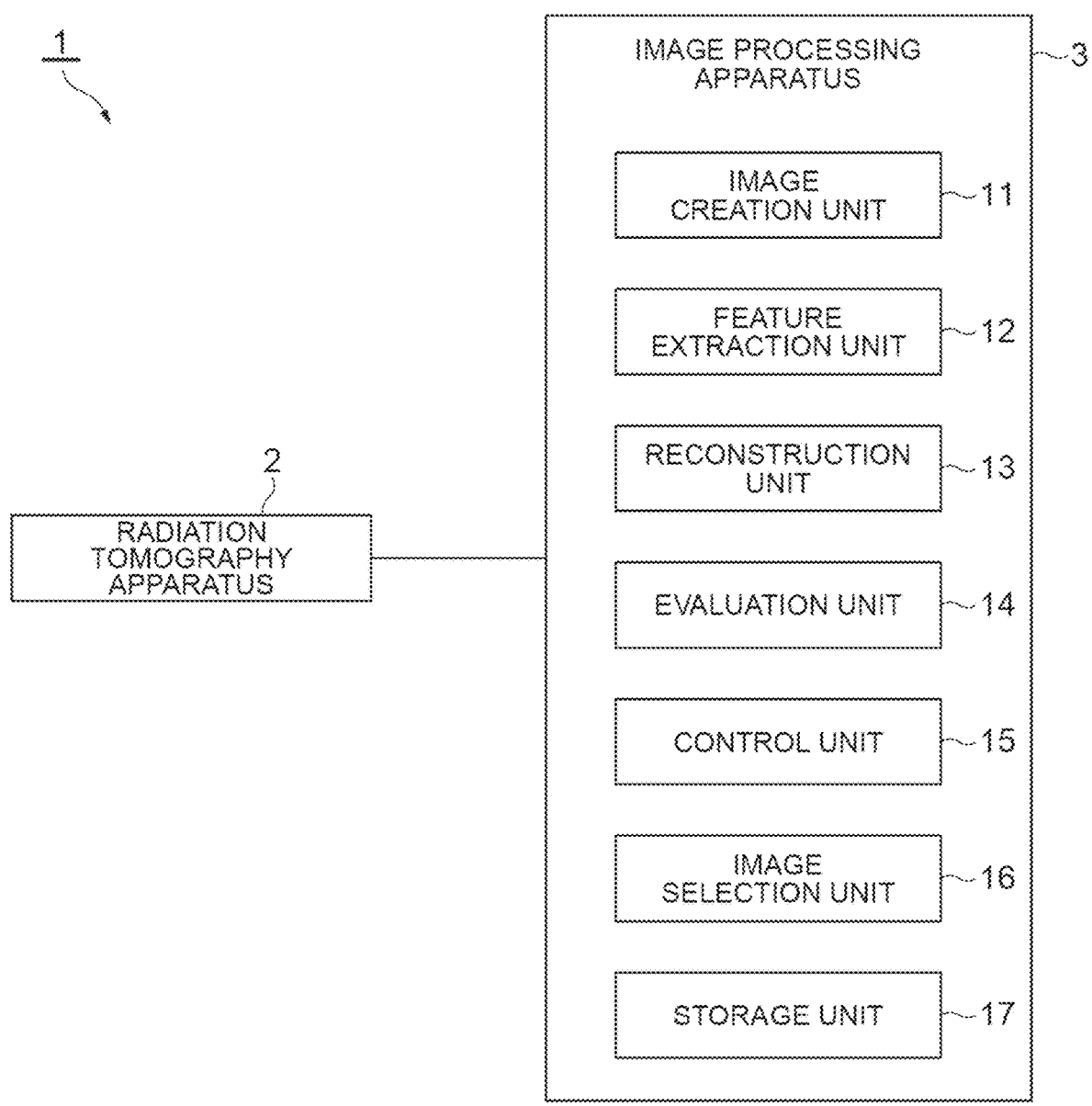
FIG. 1 is a diagram illustrating a configuration of a radiation tomography system 1.
Figure 2:
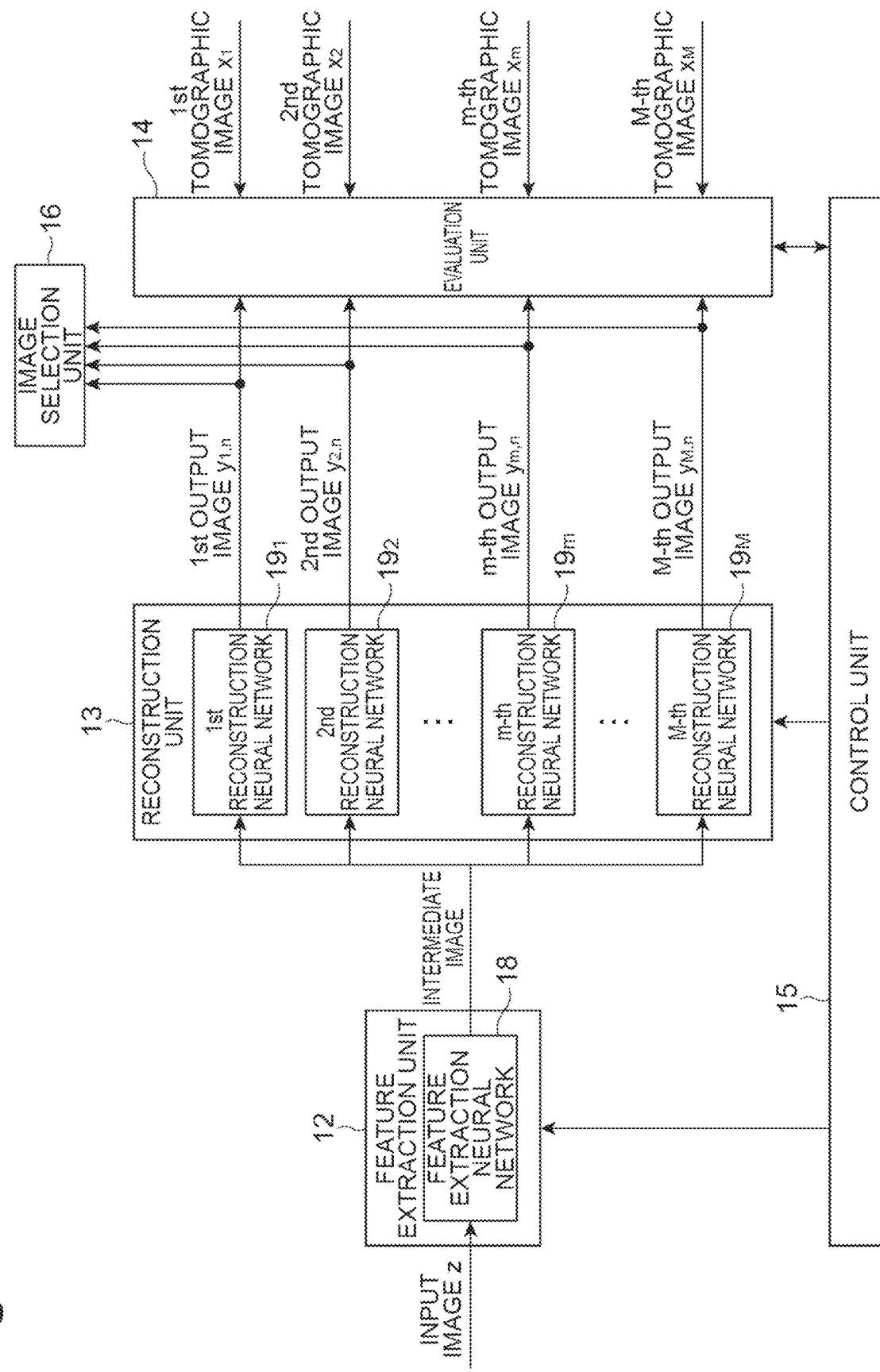
FIG. 2 is a diagram illustrating a configuration of a main part of an image processing apparatus 3.

FIG. 1 is a diagram illustrating a configuration of a radiation tomography system 1. The radiation tomography system 1 includes a radiation tomography apparatus 2 and an image processing apparatus 3. FIG. 2 is a diagram illustrating a configuration of a main part of the image processing apparatus 3.

The radiation tomography apparatus 2 is an apparatus for collecting list data for reconstructing a tomographic image of a subject. Examples of the radiation tomography apparatus 2 include a PET apparatus and a SPECT apparatus. In the following description, it is assumed that the radiation tomography apparatus 2 is a PET apparatus.

The image processing apparatus 3 includes an image creation unit 11, a feature extraction unit 12, a reconstruction unit 13, an evaluation unit 14, a control unit 15, an image selection unit 16, and a storage unit 17. As the image processing apparatus 3, a computer including a CPU, a RAM, a ROM, a hard disk drive, and the like is used. Further, the image processing apparatus 3 includes an input unit (for example, a keyboard or a mouse) for receiving an input of an operator, and includes a display unit (for example, a liquid crystal display) for displaying an image and the like.

The radiation tomography apparatus 2 includes a detection unit having a large number of small radiation detectors being arranged around a measurement space in which the subject is placed. The radiation tomography apparatus 2 detects a photon pair of an energy of 511 keV generated by electron-positron annihilation in the subject into which a positron-emitting isotope (RI source) is injected by a coincidence method using the detection unit, and accumulates coincidence information. Further, the radiation tomography apparatus 2 outputs, to the image processing apparatus 3, the list data in which the accumulated many pieces of the coincidence information are arranged in time series.

The list data includes identification information and detection time information of a pair of radiation detectors used in coincidence detection of the photon pair. The list data may further include energy information of photons detected by the radiation detectors and detection time difference information of the pair of radiation detectors.

The image processing apparatus 3 reconstructs the tomographic image based on the list data. As techniques for reconstructing the tomographic image based on the list data, a maximum likelihood expectation maximization (ML-EM) method, and a successive approximation type image reconstruction technique based on a block iterative method obtained by improving the above method are known. Further, as the successive approximation type image reconstruction technique by the block iterative method, an ordered subset ML-EM (OSEM) method, a row-action maximum likelihood algorithm (RAMLA) method, a dynamic RAMLA (DRAMA) method, and the like are known. Further, the image processing apparatus 3 creates the tomographic image after noise removal processing using a DNN (preferably a CNN).

The image creation unit 11 divides the list data into a plurality of frames (1st to M-th frames) in a collection order, performs reconstruction processing on each of the plurality of frames by using the data included in an m-th frame in the list data, and creates a tomographic image $x_m$ (m-th tomographic image $x_m$) of the m-th frame. The M tomographic images $x_1$ to $x_M$ are dynamic PET images, and are used as teacher images of a neural network.

The image creation unit 11 may create an input image z to be input to the neural network. The input image z is preferably an image showing form information of the subject. Specifically, the input image z may be a tomographic image created by performing reconstruction processing using the list data larger than the list data used in creating the m-th tomographic image $x_m$. The input image z may be a static PET image.

The input image z may be created for each frame, and further, may be created in common for all frames, or may be created in common for some frames. The input image z may be a tomographic image created by performing reconstruction processing using all of the list data. Further, the input image z may be an MRI image of the subject or a CT image of the subject.

The feature extraction unit 12 inputs the input image z to a feature extraction neural network (feature extraction NN) 18 and outputs an intermediate image from the feature extraction NN 18. The reconstruction unit 13 inputs the intermediate image to an m-th reconstruction neural network (m-th reconstruction NN) $19_m$ and outputs an m-th output image $y_{m,n}$ from the m-th reconstruction NN $19_m$. In addition, in is an integer of 1 or more and M or less. n is an integer of 0 or more and represents the number of times of training of the feature extraction NN 18 and the m-th reconstruction NN $19_m$.

Each of the feature extraction NN 18 and the m-th reconstruction NN $19_m$ is a DNN, preferably a CNN. The feature extraction NN 18 may have a U-net architecture. The M reconstruction NNs $19_1$ to $19_M$ may have a common configuration.

The evaluation unit 14 obtains an evaluation value based on the sum of differences between the m-th tomographic image $x_m$ and the m-th output image $y_{m,n}$. For example, the evaluation unit 14 may calculate the evaluation value according to the following Formula (1), or may calculate the evaluation value according to the following Formula (2) by further using the input image z when the input image z is the static PET image.

[Formula 1]

$$\operatorname{argmin} \sum_{m=1}^{M} \|x_m - y_{m,n}\| \tag{1}$$

[Formula 2]

$$\operatorname{argmin}\left(\sum_{m=1}^{M} \|x_m - y_{m,n}\| + \left\|\sum_{m=1}^{M} y_{m,n} - z\right\|\right) \tag{2}$$

The control unit 15 repeatedly performs processes of the feature extraction unit 12 and the reconstruction unit 13, calculation of the evaluation value by the evaluation unit 14, and training of the feature extraction NN 18 and the m-th reconstruction NN $19_m$ based on the evaluation value. Further, the control unit 15 outputs the m-th output image $y_{m,n}$ from the m-th reconstruction NN $19_m$ that has been trained n times. In addition, each training of the feature extraction NN 18 and the m-th reconstruction NN $19_m$ is collectively performed such that the evaluation value becomes small.

The image selection unit 16 selects any one image from the plurality of m-th output images $y_{m,0}$ to $y_{m,N}$ for each of the 1st to M-th frames as the tomographic image after the noise removal processing. Preferably, the image selection unit 16 selects the one m-th output image from the plurality of m-th output images $y_{m,0}$ to $y_{m,N}$ based on a comparison between the m-th output image $y_{m,n}$ and the input image z.

For example, the m-th output image having the smallest error between the m-th output image $y_{m,n}$ and the input image z may be selected, or the any one m-th output image may be selected from one or two or more m-th output images having the errors between the m-th output image $y_{m,n}$ and the input image z of a threshold value or less. In addition, a doctor, an operator, or the like may select the any one m-th output image from the plurality of m-th output images $y_{m,0}$ to $y_{m,N}$ for each frame.

The storage unit 17 stores the list data, the input image z, the intermediate image, the m-th output image $y_{m,n}$ of each frame, the m-th tomographic image $x_m$ of each frame, and the like. Further, the storage unit 17 stores the m-th output image selected from the plurality of m-th output images $y_{m,0}$ to $y_{m,N}$ of each frame.

Figure 3:
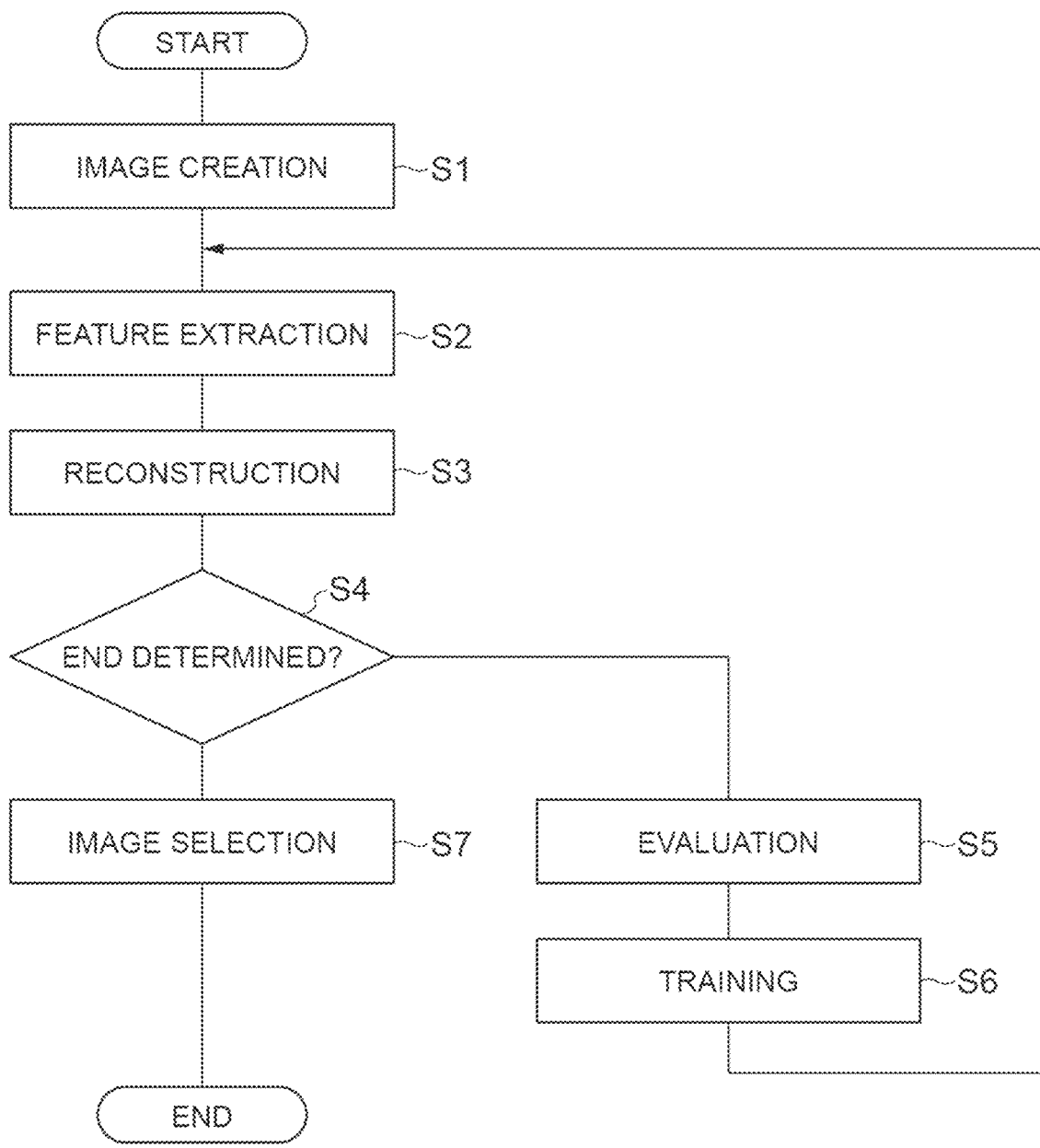
FIG. 3 is a flowchart illustrating an image processing method.

FIG. 3 is a flowchart illustrating an image processing method. The image processing method includes an image creation step S1, a feature extraction step S2, a reconstruction step S3, an end determination step S4, an evaluation step S5, a training step S6, and an image selection step S7.

The image creation step S1 is a process performed by the image creation unit 11. In the image creation step S1, the list data is divided into the plurality of frames (1st to M-th frames) in a collection order, and reconstruction processing is performed on each of the plurality of frames using the data included in the m-th frame in the list data to create the tomographic image $x_m$ (m-th tomographic image $x_m$) of the m-th frame. Further, in the image creation step S1, for example, the tomographic image (input image z) may be created by performing reconstruction processing using all of the list data.

The feature extraction step S2 is a process performed by the feature extraction unit 12. In the feature extraction step S2, the input image z is input to the feature extraction NN 18, and the intermediate image is output from the feature extraction NN 18.

The reconstruction step S3 is a process performed by the reconstruction unit 13. In the reconstruction step S3, the intermediate image is input to the m-th reconstruction NN $19_m$, and the m-th output image $y_{m,n}$ is output from the m-th reconstruction NN $19_m$.

The end determination step S4 is a process performed by the control unit 15. In the end determination step S4, it is determined whether or not to end the repetition of the respective processes of the steps S2 to S6. This determination may be based on whether or not the number of repetitions reaches a predetermined value, or may be based on whether or not the error between the m-th output image $y_{m,n}$ and the input image z becomes the threshold value or less.

In the end determination step S4, when it is determined that the repetition of the respective processes of the steps S2 to S6 is to be continued, the process proceeds to the evaluation step S5, and when it is determined that the repetition of the respective processes of the steps S2 to S6 is to be ended, the process proceeds to the image selection step S7.

The evaluation step S5 is a process performed by the evaluation unit 14. In the evaluation step S5, the evaluation value (for example, the above Formula (1) or Formula (2)) is obtained based on the sum of differences between the m-th tomographic images $x_m$ and the m-th output images $y_{m,n}$.

The training step S6 is a process performed by the control unit 15 on the feature extraction NN 18 and the m-th reconstruction NN $19_m$. In the training step S6, overall training of the feature extraction NN 18 and the m-th reconstruction NN $19_m$ is performed based on the evaluation value. After the training step S6, the process returns to the feature extraction step S2.

The image selection step S7 is a process performed by the image selection unit 16. In the image selection step S7, for each of the 1st to M-th frames, any one image is selected from the plurality of m-th output images $y_{m,0}$ to $y_{m,N}$ as the tomographic image after the noise removal processing.

Next, simulation results will be described. A numerical phantom used in the simulation simulates a human brain into which $^{18}$F-FDG (fluorodeoxyglucose) is introduced. The numerical phantom contains a white matter (WM), a gray matter (GM), and a tumor.

Figure 4:
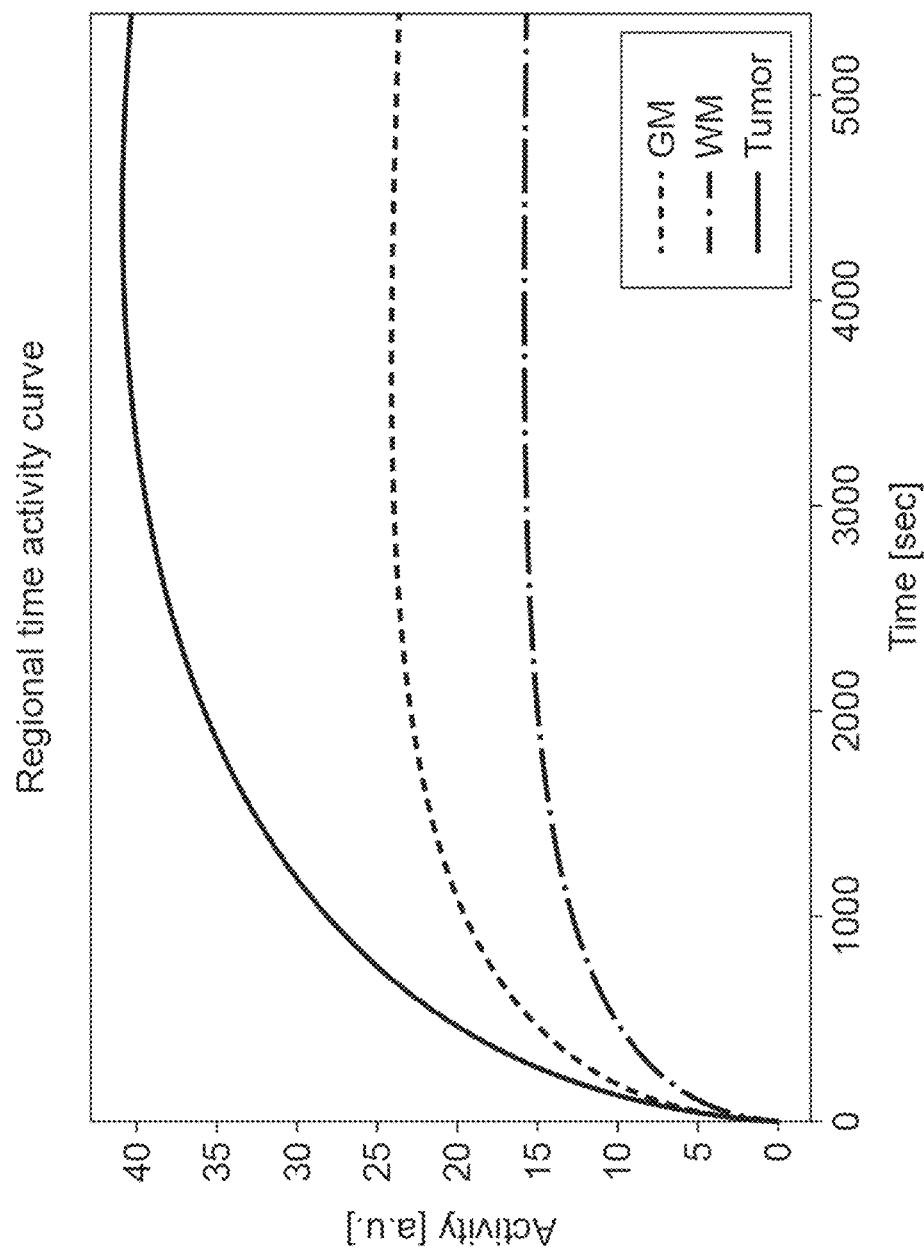
FIG. 4 is a graph showing a model of temporal changes of activities of a white matter (WM), a gray matter (GM), and a tumor used in a simulation.

FIG. 4 is a graph showing a model of temporal changes of activities of the white matter (WM), the gray matter (GM), and the tumor used in the simulation. In general, the temporal change of the activity (TAC: Time-Activity Curve) gradually increases with time from the time immediately after the input of the RI source, reaches a peak at a certain time, and gradually decreases after the peak.

The total number of counts (number of pieces of coincidence information) was set to $1 \times 10^9$. The measurement time was set to 90 minutes, and the list data was divided into 30 frames. Each period for 1st to 4th frames was set to 20 seconds, each period for 5th to 8th frames was set to 40 seconds, each period for 9th to 12th frames was set to 60 seconds, each period for 13th to 16th frames was set to 180 seconds, and each period for 17th to 30th frames was set to 300 seconds.

The numerical phantom has a three-dimensional structure of 192×192×64 voxels. A sinogram of each frame was created based on the numerical phantom. The sinogram is a histogram of the coincidence information for each pair of radiation detectors in the radiation tomography apparatus 2. A noise-added sinogram was created by applying Poisson noise to the sinogram of each frame according to the number of counts of the frame. A reconstructed image (m-th tomographic image $x_m$) was created by the OS-EM method based on the noise-added sinogram. The number of repetitions in the OS-EM method was set to 6, and the number of subsets was set to 16.

Figure 5:
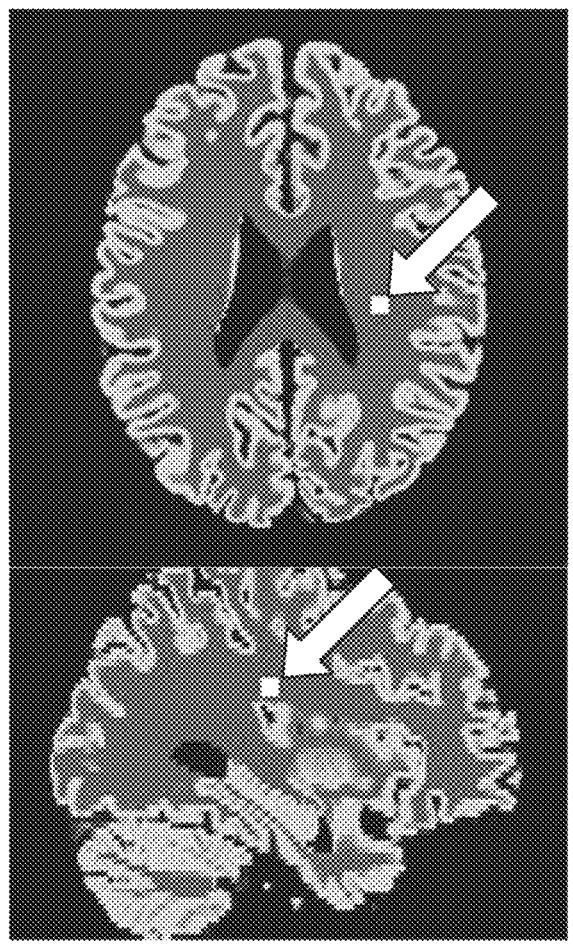
FIG. 5 is a diagram showing a numerical phantom image.
Figure 6:
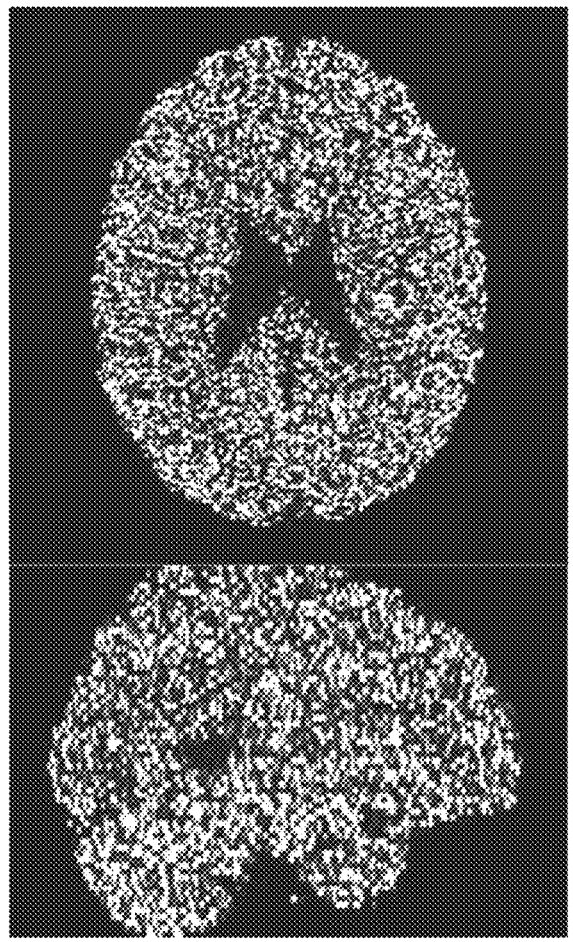
FIG. 6 is a diagram showing a 16th tomographic image $x_{16}$ before noise removal processing.

In the following, in addition to a numerical phantom image, examples of tomographic images before or after noise removal processing are shown. Further, in each diagram, two tomographic images whose slice planes are perpendicular to each other are shown. FIG. 5 is a diagram showing the numerical phantom image. In the image of FIG. 5, arrows indicate the tumor. FIG. 6 is a diagram showing a 16th tomographic image $x_{16}$ before the noise removal processing. The image of FIG. 6 contains a large amount of noise, and it is difficult to identify the tumor.

Figure 7:
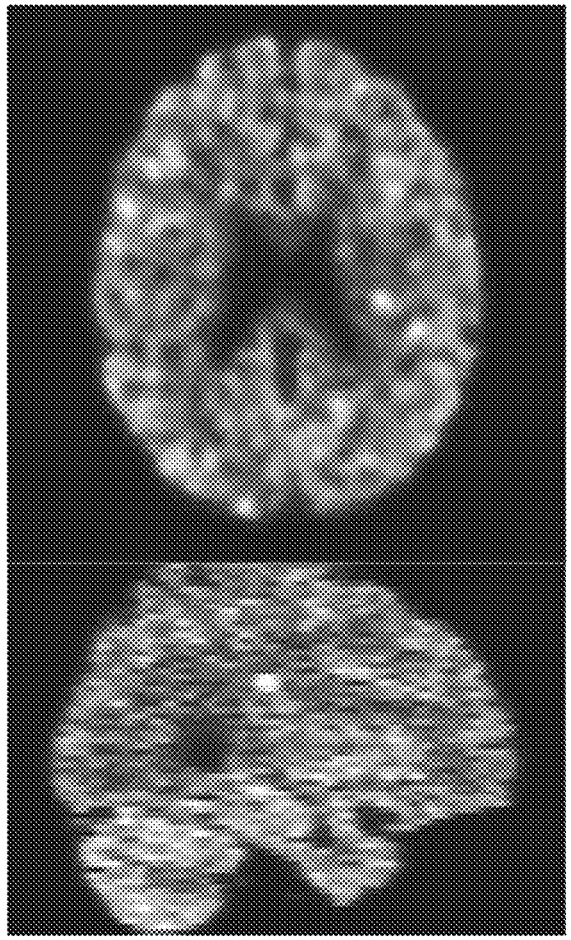
FIG. 7 is a diagram showing an image obtained by performing noise removal processing of a first comparative example on the 16th tomographic image $x_{16}$ of FIG. 6.

FIG. 7 is a diagram showing an image obtained by performing noise removal processing of a first comparative example on the 16th tomographic image $x_{16}$ of FIG. 6. The noise removal processing of the first comparative example is processing by a Gaussian filter. Although the image of FIG. 7 contains a lot of noise and is unclear as a whole, it is possible to identify the tumor.

Figure 8:
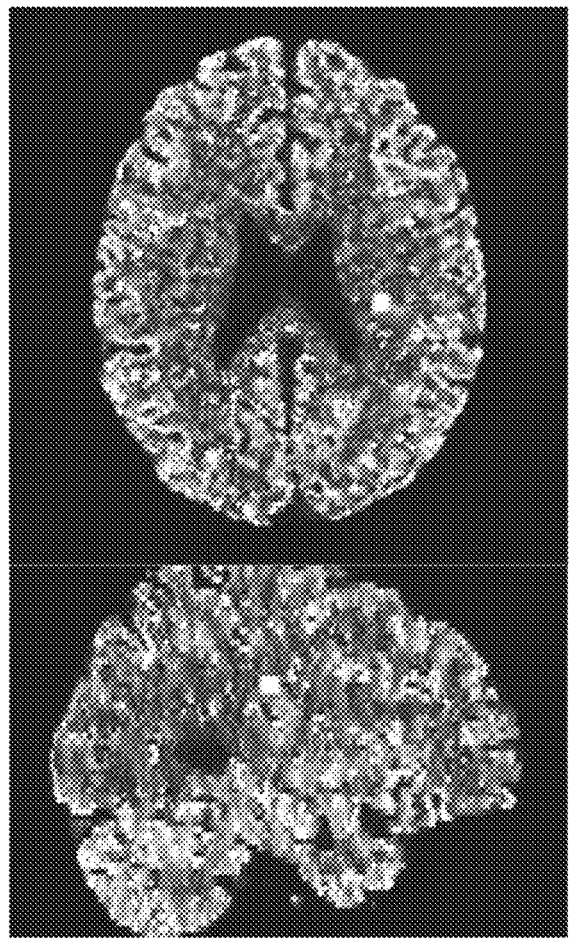
FIG. 8 is a diagram showing an image obtained by performing noise removal processing of a second comparative example on the 16th tomographic image $x_{16}$ of FIG. 6.

FIG. 8 is a diagram showing an image obtained by performing noise removal processing of a second comparative example on the 16th tomographic image $x_{16}$ of FIG. 6. The noise removal processing of the second comparative example is processing described in Non Patent Document 2. Although the image of FIG. 8 contains a lot of noise, a boundary of shading becomes clear, and it is possible to identify the tumor.

Figure 9:
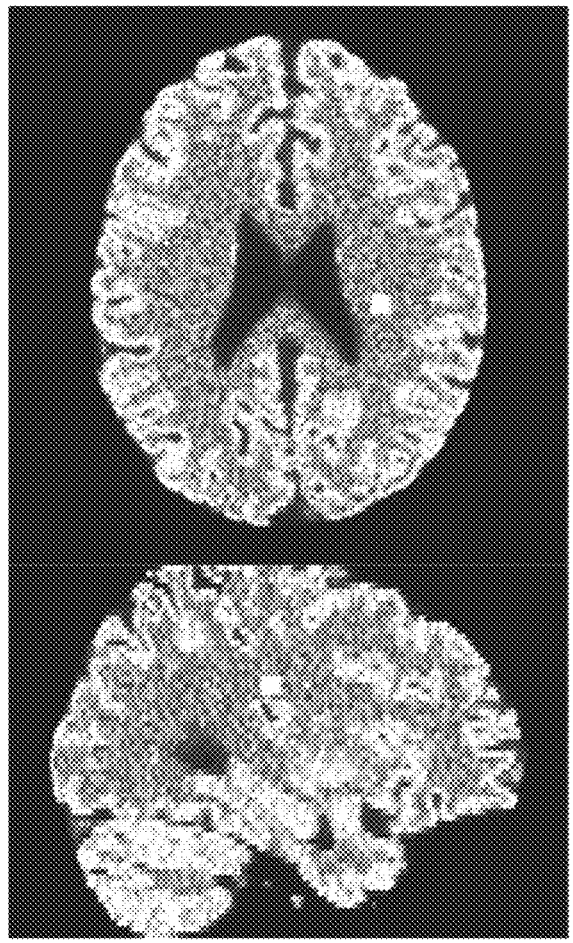
FIG. 9 is a diagram showing a tomographic image (static PET image) created by performing reconstruction processing using all of list data.

FIG. 9 is a diagram showing a tomographic image (static PET image) created by performing reconstruction processing using all of the list data. In a third comparative example and a first example, this static PET image was used as the input image to the neural network.

Figure 10:
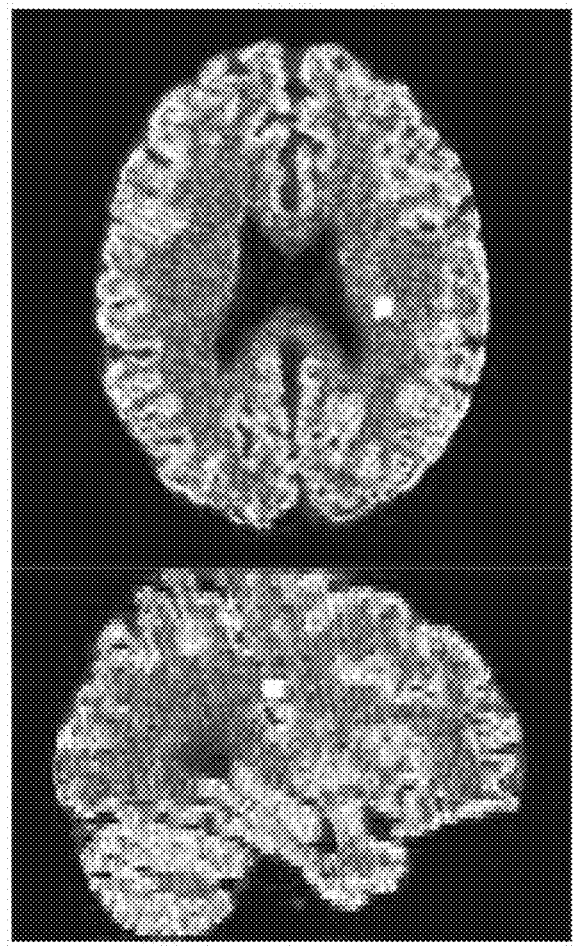
FIG. 10 is a diagram showing an image obtained by performing noise removal processing of a third comparative example on the 16th tomographic image $x_{16}$ of FIG. 6.

FIG. 10 is a diagram showing an image obtained by performing noise removal processing of the third comparative example on the 16th tomographic image $x_{16}$ of FIG. 6. The noise removal processing of the third comparative example is processing described in Non Patent Document 5. In the image of FIG. 10, as compared with the images of the first and second comparative examples, noise is sufficiently removed, a boundary of shading becomes clear, and it is possible to identify the tumor.

Figure 11:
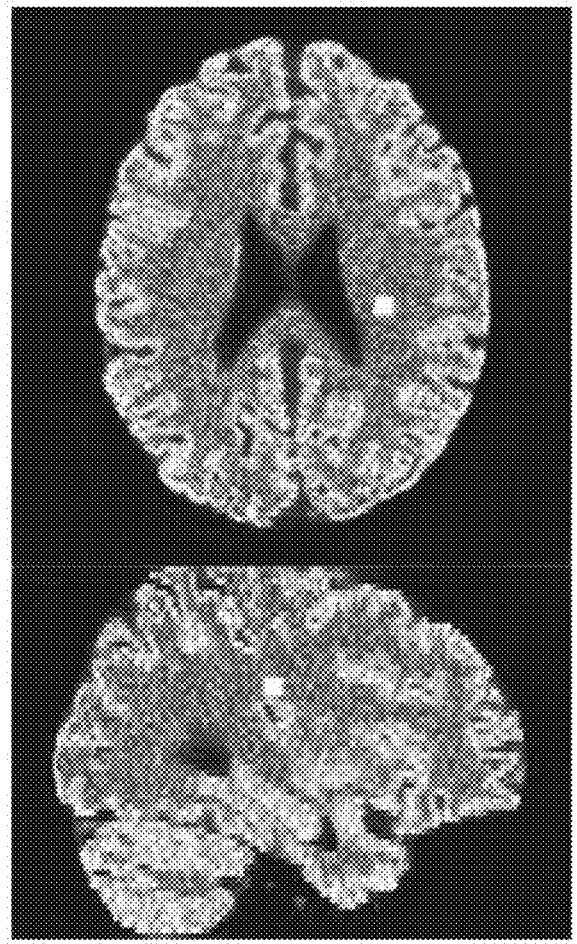
FIG. 11 is a diagram showing an image obtained by performing noise removal processing of a first example on the 16th tomographic image $x_{16}$ of FIG. 6.

FIG. 11 is a diagram showing an image obtained by performing noise removal processing of the first example on the 16th tomographic image $x_{16}$ of FIG. 6. The noise removal processing of the first example is according to the present embodiment. In the image of FIG. 11, as compared with the image of FIG. 10, noise is further sufficiently removed, a boundary of shading becomes clear, and it is possible to identify the tumor.

Figure 12:
FIG. 12 is a diagram showing an MRI image.

FIG. 12 is a diagram showing an MRI image (T1 weighted image). The tumor is not identified in this MRI image. In a fourth comparative example and a second example, this MRI image was used as the input image to the neural network.

Figure 13:
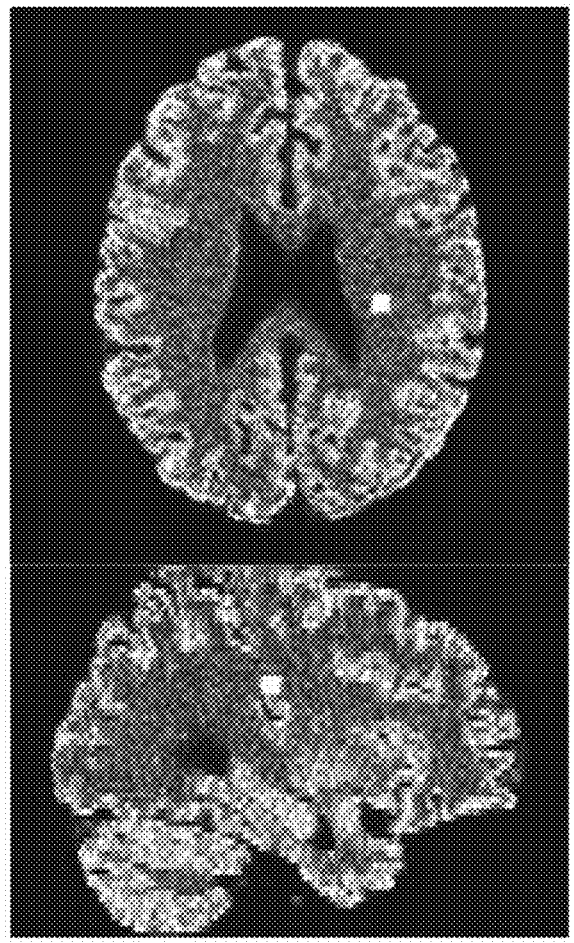
FIG. 13 is a diagram showing an image obtained by performing noise removal processing of a fourth comparative example on the 16th tomographic image $x_{16}$ of FIG. 6.

FIG. 13 is a diagram showing an image obtained by performing noise removal processing of the fourth comparative example on the 16th tomographic image $x_{16}$ of FIG. 6. The noise removal processing of the fourth comparative example is processing described in Non Patent Document 5. In the image of FIG. 13, as compared with the images of the first and second comparative examples, noise is sufficiently removed, a boundary of shading becomes clear, and it is possible to identify the tumor.

Figure 14:
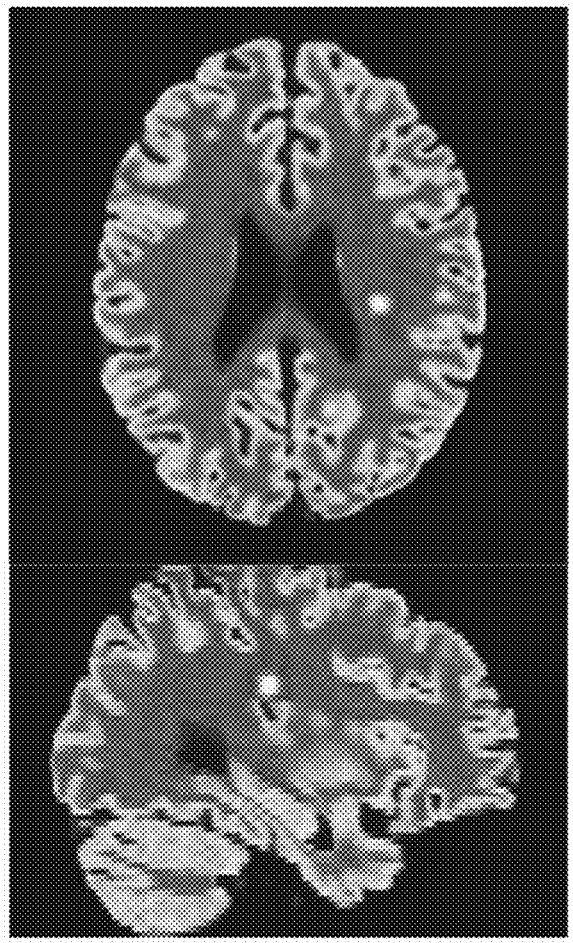
FIG. 14 is a diagram showing an image obtained by performing noise removal processing of a second example on the 16th tomographic image $x_{16}$ of FIG. 6.

FIG. 14 is a diagram showing an image obtained by performing noise removal processing of the second example on the 16th tomographic image $x_{16}$ of FIG. 6. The noise removal processing of the second example is according to the present embodiment. In the image of FIG. 14, as compared with the image of FIG. 13, noise is further sufficiently removed, a boundary of shading becomes clear, and it is possible to identify the tumor.

Figure 15:
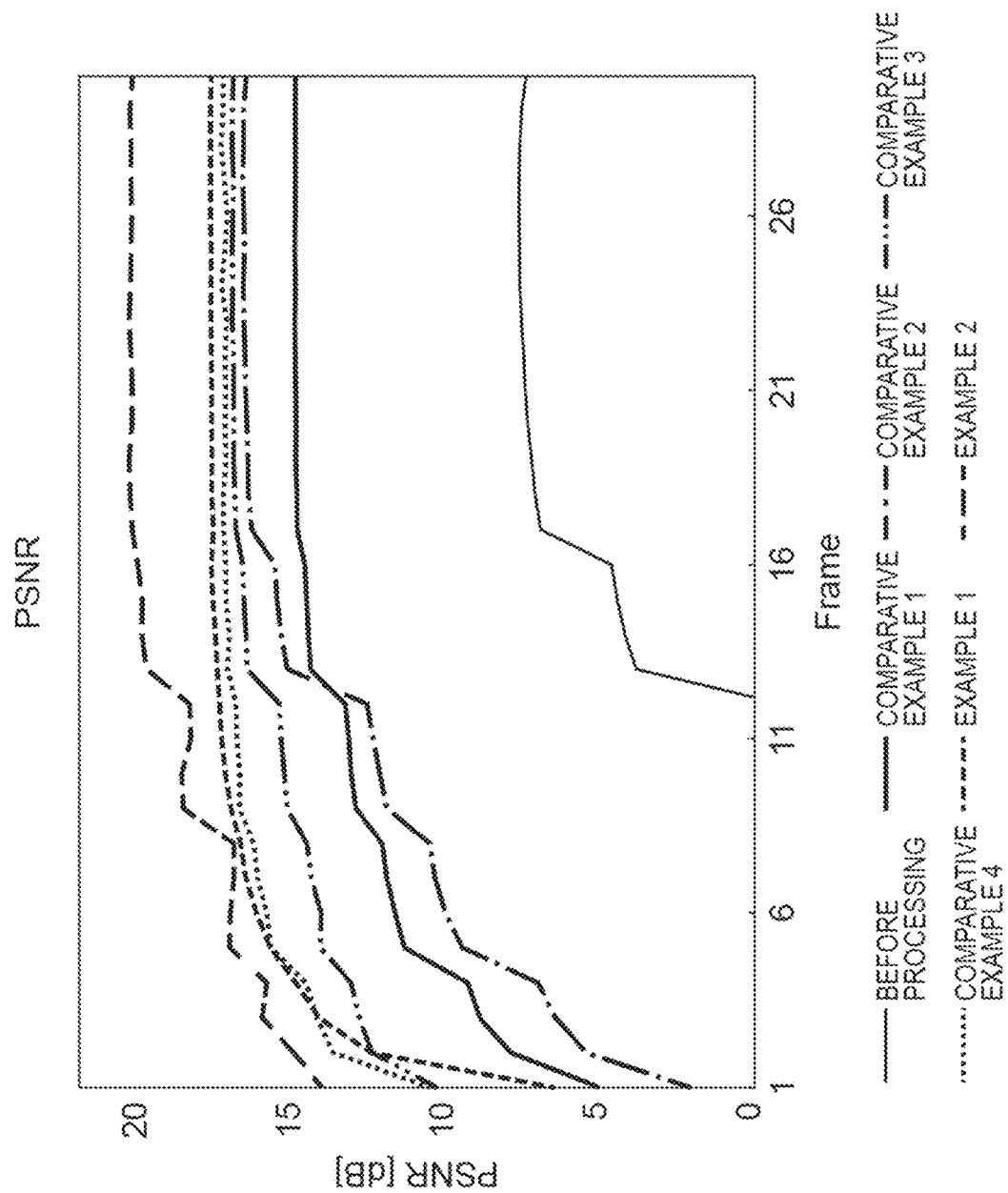
FIG. 15 is a graph showing temporal changes of PSNR for the tomographic image before the noise removal processing, the images after the noise removal processing of the first to fourth comparative examples, and the images after the noise removal processing of the first and second examples.

FIG. 15 is a graph showing temporal changes of PSNR for the tomographic image before the noise removal processing, the images after the noise removal processing of the first to fourth comparative examples, and the images after the noise removal processing of the first and second examples. The PSNR (Peak Signal to Noise Ratio) represents the quality of the image in decibels (dB), and a higher value means better image quality.

Figure 16:
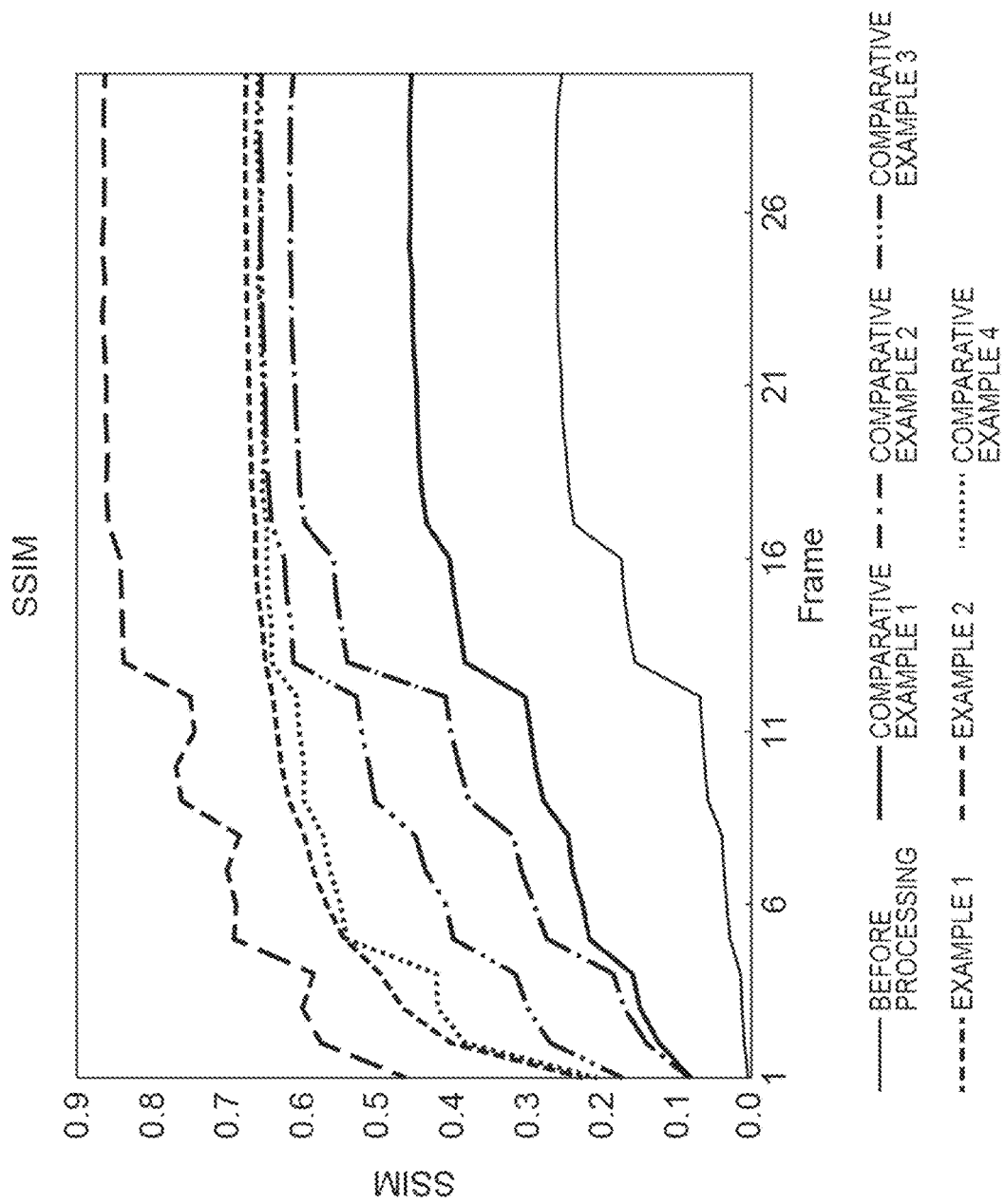
FIG. 16 FIG. 16 is a graph showing temporal changes of S SIM for the tomographic image before the noise removal processing, the images after the noise removal processing of the first to fourth comparative examples, and the images after the noise removal processing of the first and second examples.

FIG. 16 is a graph showing temporal changes of SSIM for the tomographic image before the noise removal processing, the images after the noise removal processing of the first to fourth comparative examples, and the images after the noise removal processing of the first and second examples. The SSIM (Structural Similarity Index) is an index for quantifying the change of the intensity, contrast, and structure in the image, and a higher value means better image quality.

Both indexes of PSNR and SSIM show better performance for the noise removal processing of the third and fourth comparative examples compared with the noise removal processing of the first and second comparative examples, and further, show better performance for the noise removal processing of the first and second examples compared with the noise removal processing of the third and fourth comparative examples. For other frames also, the noise removal processing of the first and second examples has better performance.

The reason why the noise removal processing of the present embodiment is superior in performance to the noise removal processing described in Non Patent Document 5 is considered as follows.

The image processing apparatus 3 of the present embodiment includes the process by the feature extraction NN 18 in the feature extraction unit 12 and the process by the m-th reconstruction NN $19_m$ of each frame in the reconstruction unit 13. Further, the image processing apparatus 3 inputs the intermediate image output from the feature extraction NN 18 to the m-th reconstruction NN $19_m$ of each frame, obtains the evaluation value based on the sum of the difference between the m-th output image $y_{m,n}$ output from the m-th reconstruction NN $19_m$ at that time and the m-th tomographic image $x_m$, and trains the feature extraction NN 18 and the m-th reconstruction NN $19_m$ based on the evaluation value.

Since the m-th tomographic images $x_m$ of the respective frames include common information, by repeatedly performing training based on the evaluation value as described above, the feature extraction NN 18 can output the intermediate image representing the common information extracted from the m-th tomographic image $x_m$ of each frame, and the m-th reconstruction NN $19_m$ estimates the m-th output image $y_{m,n}$ from the intermediate image. Accordingly, it is considered that performance of the noise removal processing is improved in the present embodiment.

In the noise removal processing described in Non Patent Document 5, the m-th tomographic image $x_m$ of each frame is set as the teacher image, the neural network is trained using a combination of the teacher image and the input image z, and training is repeated by the number of frames. On the other hand, in the noise removal processing of the present embodiment, training of the feature extraction NN 18 can be performed for the plurality of frames in common. Accordingly, as compared with the noise removal processing described in Non Patent Document 5, required time can be reduced in the noise removal processing of the present embodiment.

The present invention is not limited to the embodiments and configuration examples described above, and various modifications are possible. For example, the radiation tomography apparatus 2 is a PET apparatus in the above embodiment, but may be a SPECT apparatus.

The image processing apparatus of the above embodiment is an apparatus for removing noise from an m-th tomographic image created by dividing list data collected by a radiation tomography apparatus into M frames in a collection order and performing reconstruction processing based on the list data included in an m-th frame for each in of 1 or more and M or less, and includes (1) a feature extraction unit for inputting an input image to a feature extraction neural network and outputting an intermediate image from the feature extraction neural network; (2) a reconstruction unit for inputting the intermediate image to an m-th reconstruction neural network for each in of 1 or more and M or less and outputting an m-th output image from the m-th reconstruction neural network; (3) an evaluation unit for obtaining an evaluation value based on a sum of differences between the m-th tomographic image and the m-th output image of each in of 1 or more and M or less; and (4) a control unit for repeatedly performing respective processes of the feature extraction unit, the reconstruction unit, and the evaluation unit and training of the feature extraction neural network and the m-th reconstruction neural network of each in of 1 or more and M or less based on the evaluation value, and outputting a plurality of m-th output images from the m-th reconstruction neural network of each in of 1 or more and M or less.

In the above image processing apparatus, the feature extraction unit may input an image showing form information of a subject to the feature extraction neural network as the input image. Further, the feature extraction unit may input a tomographic image created by performing reconstruction processing using list data larger than the list data used in creating the m-th tomographic image for each in of 1 or more and M or less to the feature extraction neural network as the input image.

In the above image processing apparatus, the feature extraction unit may input an MRI image of a subject to the feature extraction neural network as the input image. Further, the feature extraction unit may input a CT image of a subject to the feature extraction neural network as the input image.

The above image processing apparatus may further include an image selection unit for selecting one m-th output image from the plurality of m-th output images obtained for each in of 1 or more and M or less as a tomographic image after noise removal processing. Further, the image selection unit may select the one m-th output image from the plurality of m-th output images based on a comparison between the m-th output image and the input image for each in of 1 or more and M or less. Further, the image selection unit may select the one m-th output image from the plurality of m-th output images based on a comparison between the m-th tomographic image and the input image for each in of 1 or more and M or less.

The radiation tomography system of the above embodiment includes a radiation tomography apparatus for collecting list data for reconstructing a tomographic image of a subject; and the image processing apparatus of the above configuration for creating the tomographic image after noise removal processing based on the list data collected by the radiation tomography apparatus.

The image processing method of the above embodiment is a method for removing noise from an m-th tomographic image created by dividing list data collected by a radiation tomography apparatus into M frames in a collection order and performing reconstruction processing based on the list data included in an m-th frame for each in of 1 or more and M or less, and includes (1) a feature extraction step of inputting an input image to a feature extraction neural network and outputting an intermediate image from the feature extraction neural network; (2) a reconstruction step of inputting the intermediate image to an m-th reconstruction neural network for each in of 1 or more and M or less and outputting an m-th output image from the m-th reconstruction neural network; (3) an evaluation step of obtaining an evaluation value based on a sum of differences between the m-th tomographic image and the m-th output image of each in of 1 or more and M or less; and (4) a training step of training the feature extraction neural network and the m-th reconstruction neural network of each in of 1 or more and M or less based on the evaluation value, and respective processes of the feature extraction step, the reconstruction step, the evaluation step, and the training step are repeatedly performed, and a plurality of m-th output images are output from the m-th reconstruction neural network of each in of 1 or more and M or less.

In the above image processing method, in the feature extraction step, an image showing form information of a subject may be input to the feature extraction neural network as the input image. Further, in the feature extraction step, a tomographic image created by performing reconstruction processing using list data larger than the list data used in creating the m-th tomographic image for each in of 1 or more and M or less may be input to the feature extraction neural network as the input image.

In the above image processing method, in the feature extraction step, an MRI image of a subject may be input to the feature extraction neural network as the input image. Further, in the feature extraction step, a CT image of a subject may be input to the feature extraction neural network as the input image.

The above image processing method may further include an image selection step of selecting one m-th output image from the plurality of m-th output images obtained for each in of 1 or more and M or less as a tomographic image after noise removal processing. Further, in the image selection step, the one m-th output image may be selected from the plurality of m-th output images based on a comparison between the m-th output image and the input image for each in of 1 or more and M or less. Further, in the image selection step, the one m-th output image may be selected from the plurality of m-th output images based on a comparison between the m-th tomographic image and the input image for each in of 1 or more and M or less.

INDUSTRIAL APPLICABILITY

The present invention can be used as an apparatus and a method capable of creating a noise-removed tomographic image with high performance based on list data collected by a radiation tomography apparatus and reducing time required for noise removal processing.

REFERENCE SIGNS LIST

1—radiation tomography system, 2—radiation tomography apparatus, 3—image processing apparatus, 11—image creation unit, 12—feature extraction unit, 13—reconstruction unit, 14—evaluation unit, 15—control unit, 16—image selection unit, 17—storage unit, 18—feature extraction neural network (feature extraction NN), $19_m$-th reconstruction neural network (m-th reconstruction NN).

The invention claimed is:

1. An image processing apparatus for removing noise from an m-th tomographic image created by dividing list data collected by a radiation tomography apparatus into M frames in a collection order and performing reconstruction processing based on the list data included in an m-th frame for each m of 1 or more and M or less, the apparatus comprising:
 a feature extraction unit configured to input an input image to a feature extraction neural network and output an intermediate image from the feature extraction neural network;
 a reconstruction unit configured to input the intermediate image to an m-th reconstruction neural network for each m of 1 or more and M or less and output an m-th output image from the m-th reconstruction neural network;
 an evaluation unit configured to obtain an evaluation value based on a sum of differences between the m-th tomographic image and the m-th output image of each m of 1 or more and M or less; and
 a control unit configured to repeatedly perform respective processes of the feature extraction unit, the reconstruction unit, and the evaluation unit and training of the feature extraction neural network and the m-th reconstruction neural network of each m of 1 or more and M or less based on the evaluation value, and output a plurality of m-th output images from the m-th reconstruction neural network of each m of 1 or more and M or less, wherein
 M is an integer of 2 or more, the feature extraction neural network is a single neural network provided commonly for the first to M-th reconstruction neural networks, and the feature extraction neural network outputs the intermediate image representing common information extracted from the first to M-th tomographic images.

2. The image processing apparatus according to claim 1, wherein the feature extraction unit is configured to input an image showing form information of a subject to the feature extraction neural network as the input image.

3. The image processing apparatus according to claim 1, wherein the feature extraction unit is configured to input a tomographic image created by performing reconstruction processing using list data larger than the list data used in creating the m-th tomographic image for each m of 1 or more and M or less to the feature extraction neural network as the input image.

4. The image processing apparatus according to claim 1, wherein the feature extraction unit is configured to input an MRI image of a subject to the feature extraction neural network as the input image.

5. The image processing apparatus according to claim 1, wherein the feature extraction unit is configured to input a CT image of a subject to the feature extraction neural network as the input image.

6. The image processing apparatus according to claim 1, further comprising an image selection unit configured to select one m-th output image from the plurality of m-th output images obtained for each m of 1 or more and M or less as a tomographic image after noise removal processing.

7. The image processing apparatus according to claim 6, wherein the image selection unit is configured to select the one m-th output image from the plurality of m-th output images based on a comparison between the m-th output image and the input image for each m of 1 or more and M or less.

8. A radiation tomography system comprising:
a radiation tomography apparatus configured to collect list data for reconstructing a tomographic image of a subject; and
the image processing apparatus according to claim 1 configured to create the tomographic image after noise removal processing based on the list data collected by the radiation tomography apparatus.

9. An image processing method for removing noise from an m-th tomographic image created by dividing list data collected by a radiation tomography apparatus into M frames in a collection order and performing reconstruction processing based on the list data included in an m-th frame for each m of 1 or more and M or less, the method comprising:
performing a feature extraction of inputting an input image to a feature extraction neural network and outputting an intermediate image from the feature extraction neural network;
performing a reconstruction of inputting the intermediate image to an m-th reconstruction neural network for each m of 1 or more and M or less and outputting an m-th output image from the m-th reconstruction neural network;
performing an evaluation of obtaining an evaluation value based on a sum of differences between the m-th tomographic image and the m-th output image of each m of 1 or more and M or less; and
training the feature extraction neural network and the m-th reconstruction neural network of each m of 1 or more and M or less based on the evaluation value, wherein
respective processes of the feature extraction, the reconstruction, the evaluation, and the training are repeatedly performed, and a plurality of m-th output images are output from the m-th reconstruction neural network of each m of 1 or more and M or less, and
M is an integer of 2 or more, the feature extraction neural network is a single neural network provided commonly for the first to M-th reconstruction neural networks, and the feature extraction neural network outputs the intermediate image representing common information extracted from the first to M-th tomographic images.

10. The image processing method according to claim 9, wherein in the feature extraction, an image showing form information of a subject is input to the feature extraction neural network as the input image.

11. The image processing method according to claim 9, wherein in the feature extraction, a tomographic image created by performing reconstruction processing using list data larger than the list data used in creating the m-th tomographic image for each m of 1 or more and M or less is input to the feature extraction neural network as the input image.

12. The image processing method according to claim 9, wherein in the feature extraction, an MRI image of a subject is input to the feature extraction neural network as the input image.

13. The image processing method according to claim 9, wherein in the feature extraction, a CT image of a subject is input to the feature extraction neural network as the input image.

14. The image processing method according to claim 9, further comprising performing an image selection of selecting one m-th output image from the plurality of m-th output images obtained for each m of 1 or more and M or less as a tomographic image after noise removal processing.

15. The image processing method according to claim 14, wherein in the image selection, the one m-th output image is selected from the plurality of m-th output images based on a comparison between the m-th output image and the input image for each m of 1 or more and M or less.

* * * * *